US010118442B2

(12) United States Patent
Katsuragi et al.

(10) Patent No.: US 10,118,442 B2
(45) Date of Patent: Nov. 6, 2018

(54) METHOD FOR MANUFACTURING REAR AXLE, AND REAR AXLE

(71) Applicant: HINO MOTORS, LTD., Hino-shi (JP)

(72) Inventors: Masaki Katsuragi, Hino (JP); Tomonori Kato, Hino (JP); Shingo Sugamata, Hino (JP); Satoshi Shibata, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 221 days.

(21) Appl. No.: 14/407,147

(22) PCT Filed: May 24, 2013

(86) PCT No.: PCT/JP2013/064478
§ 371 (c)(1),
(2) Date: Dec. 11, 2014

(87) PCT Pub. No.: WO2014/017158
PCT Pub. Date: Jan. 30, 2014

(65) Prior Publication Data
US 2015/0158335 A1 Jun. 11, 2015

(30) Foreign Application Priority Data
Jul. 26, 2012 (JP) ................................. 2012-165856

(51) Int. Cl.
B60B 35/12 (2006.01)
B60B 35/14 (2006.01)
(Continued)

(52) U.S. Cl.
CPC .............. B60B 35/12 (2013.01); B23K 9/028 (2013.01); B23K 31/02 (2013.01); B60B 35/04 (2013.01);
(Continued)

(58) Field of Classification Search
CPC ........ B23K 9/028; B23K 31/02; B60B 35/04; B60B 35/12; B60B 35/14; B60B 2310/3023; B60B 2310/316
See application file for complete search history.

(56) References Cited

U.S. PATENT DOCUMENTS 1,955,824 A    4/1934 Mogford et al.
2,480,833 A *  9/1949 Buckendale ............ B60B 35/16
                                              29/463
(Continued)

FOREIGN PATENT DOCUMENTS

CN    101116925 A    2/2008
CN    201520164 U    7/2010
(Continued)

OTHER PUBLICATIONS

English Machine Translation of Daihen Corp. JP Publication No. 2008-055506.*
(Continued)

Primary Examiner — Christopher M Koehler
(74) Attorney, Agent, or Firm — Oblon, McClelland, Maier & Neustadt, L.L.P.

(57) ABSTRACT

A method for manufacturing a rear axle includes: a brake flange press-fitting step of press-fitting a brake flange to an outer peripheral surface of a rear axle housing; a brake flange welding step of welding the rear axle housing and the brake flange; an axle end press-fitting step of press-fitting an axle end to an inner peripheral surface of an end portion of the rear axle housing; and an axle end welding step of welding the rear axle housing and the axle end.

7 Claims, 8 Drawing Sheets

(51) Int. Cl.
  *B60B 35/04* (2006.01)
  *B23K 9/028* (2006.01)
  *B23K 31/02* (2006.01)
(52) U.S. Cl.
  CPC ...... *B60B 35/14* (2013.01); *B60B 2310/3023* (2013.01); *B60B 2310/316* (2013.01)

(56) References Cited

U.S. PATENT DOCUMENTS

| | | | | |
|---|---|---|---|---|
| 2003/0224863 | A1* | 12/2003 | Simboli | F16D 1/068 |
| | | | | 464/182 |
| 2007/0245798 | A1 | 10/2007 | Yang | |
| 2010/0144453 | A1* | 6/2010 | Ryu | F16C 3/02 |
| | | | | 464/182 |
| 2011/0101771 | A1* | 5/2011 | De Freitas Junior | B60B 35/08 |
| | | | | 301/124.1 |

FOREIGN PATENT DOCUMENTS

| | | |
|---|---|---|
| JP | 49-130850 A | 12/1974 |
| JP | S51-116135 | 10/1976 |
| JP | S58-006602 | 1/1983 |
| JP | S58-076403 | 5/1983 |
| JP | 59-99804 | 7/1984 |
| JP | 2-16294 | 2/1990 |
| JP | 2-286992 A | 11/1990 |
| JP | 4-91501 | 8/1992 |
| JP | 5-330355 | 12/1993 |
| JP | H06-63754 A | 3/1994 |
| JP | 2001-050413 | 2/2001 |
| JP | 2001-277812 A | 10/2001 |
| JP | 2008-55506 A | 3/2008 |
| JP | 2011-088199 | 5/2011 |

OTHER PUBLICATIONS

Combined Chinese Office Action and Search Report dated Feb. 23, 2016 in Patent Application No. 201380039368.2 (with English Translation of Category of Cited Documents).

International Preliminary Report on Patentability and Written Opinion dated Feb. 5, 2015 in PCT/JP2013/064478 (English translation only).

International Search Report dated Jul. 16, 2013 in PCT/JP2013/064478 filed May 24, 2013.

Office Action dated Nov. 1, 2016 in Japanese Patent Application No. 2012-165856.

Extended European Search Report dated Feb. 7, 2017 in Patent Application No. 13822967.9.

Office Action dated Mar. 6, 2018 in Japanese Patent Application No. 2017-097427.

Office Action issued in corresponding Japanese Application No. 2012-165856 dated Jul. 11, 2017.

* cited by examiner

METHOD FOR MANUFACTURING REAR AXLE, AND REAR AXLE

TECHNICAL FIELD

The present invention relates to a method for manufacturing a rear axle, and a rear axle manufactured by this method.

BACKGROUND ART

Conventionally, in manufacturing of a rear axle, an axle end is shrink-fitted to an end portion of a rear axle housing connected to a differential. A brake flange inserted from the end portion of the axle end is shrink-fitted to the end portion of the rear axle housing, and the rear axle housing and the axle end are welded to the whole circumference of the circumference. Then, the rear axle housing and the brake flange are welded to the whole circumference of the circumference (for example, see Patent Literature 1).

CITATION LIST

Patent Literature

Patent Literature 1: JP 05-330355A

SUMMARY OF INVENTION

Technical Problem

However, in order to shrink-fit the axle end and the brake flange with respect to the rear axle housing, since it is necessary to heat the rear axle housing and the brake flange to a high temperature, working man-hours are required.

Accordingly, according to an aspect of the present invention, an object thereof is to provide a method for manufacturing a rear axle that does not need to perform shrinkage-fit, and a rear axle manufactured by this method.

Solution to Problem

A method for manufacturing a rear axle according to an aspect of the present invention includes a brake flange press-fitting step of press-fitting a brake flange to an outer peripheral surface of a rear axle housing; a brake flange welding step of welding the rear axle housing and the brake flange; an axle end press-fitting step of press-fitting an axle end to an inner peripheral surface of an end portion of the rear axle housing; and an axle end welding step of welding the rear axle housing and the axle end.

According to the method for manufacturing the rear axle according to an aspect of the present invention, since the brake flange and the axle end are press-fitted to the rear axle housing, and the brake flange and the axle end are welded to the rear axle housing, it is possible to manufacture the rear axle without passing through the step of shrinkage-fitting. Thus, since it is possible to simplify the manufacturing step, it is possible to reduce the space and investment of the shrinkage-fitting apparatus and to achieve resource conservation and the reduction of $CO_2$ emission.

Moreover, the method further includes a reduced-diameter portion forming step of forming a reduced-diameter portion having an outer circumference of a reduced diameter at the end portion of the rear axle housing, before the brake flange press-fitting step, and in the brake flange press-fitting step, it is possible to press-fit the brake flange to the outer peripheral surface of the reduced-diameter portion.

Furthermore, in the brake flange welding step, a melt zone is formed in a gap between the rear axle housing and the brake flange by an arc generated by energizing an electrode, and before the melt zone is cured, a subsequent wire is supplied to the melt zone without being energized.

Furthermore, in the axle end welding step, a melt zone is formed in a gap between the rear axle housing and the axle end by an arc generated by energizing an electrode, and before the melt zone is cured, a subsequent wire is supplied to the melt zone without being energized.

In this case, it is possible to supply the subsequent wire to a raised portion of the melt zone in a rear of a traveling direction of the arc.

Furthermore, in the brake flange welding step and the axle end welding step, the gap may be a narrow gap having a substantially U-shaped cross-section in which facing surfaces are substantially parallel to each other.

The rear axle according to an aspect of the present invention is manufactured by the above-described method.

Since it is not shrink-fitted, the rear axle according to an aspect of the present invention exhibits suppressed thermal distortion, increased brake flange perpendicularity with respect to the rear axle housing, and reduced deflection of the axle end with respect to the rear axle housing.

Advantageous Effects of Invention

According to an aspect of the present invention, it is possible to provide a method for manufacturing a rear axle that does not need to perform shrinkage-fitting, and a rear axle manufactured by this method.

DESCRIPTION OF EMBODIMENTS

Figure 1:
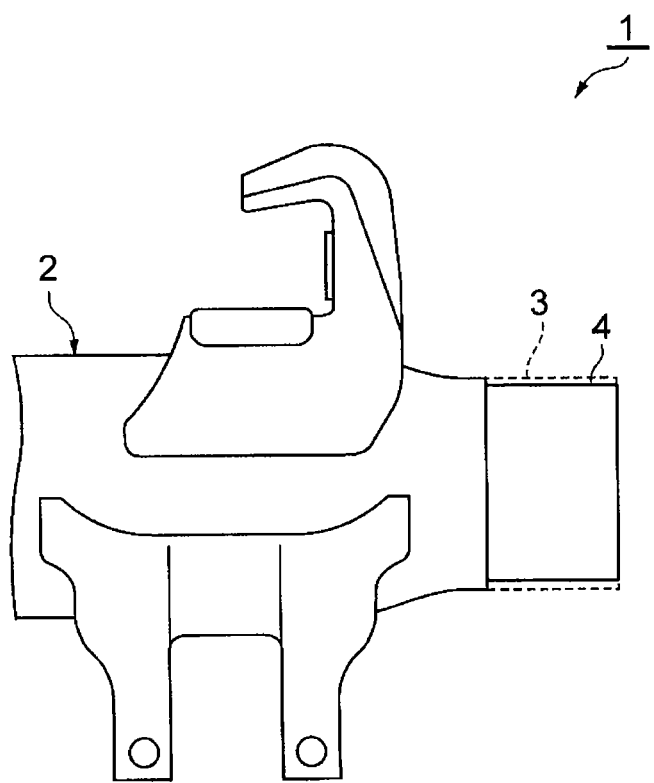
FIG. 1 is a diagram illustrating a reduced-diameter portion forming step.

Hereinafter, a preferred embodiment of an aspect of the present invention will be described in detail with reference to the drawings. In addition, the same or equivalent elements in the following description are denoted by the same reference numerals, and the repeated description will not be provided.

First, a method for manufacturing a rear axle 1 according to this embodiment performs a reduced-diameter portion forming step. As illustrated in FIG. 1, in the reduced-diameter portion forming step, a reduced-diameter portion 4 having an outer circumference of a reduced diameter is formed at an end portion 3 of a rear axle housing 2. That is, the end portion 3 of the rear axle housing 2 is formed in a cylindrical shape, and the reduced-diameter portion 4 is formed by scraping away an outer peripheral surface of the end portion 3 formed in the cylindrical shape. At this time, an outside diameter of the reduced-diameter portion 4 is set to be slightly larger than an inner diameter of the brake flange 5 which will be described later. In addition, for example, scraping away of the end portion 3 can be carried out by a general scrape cutter.

Figure 2:
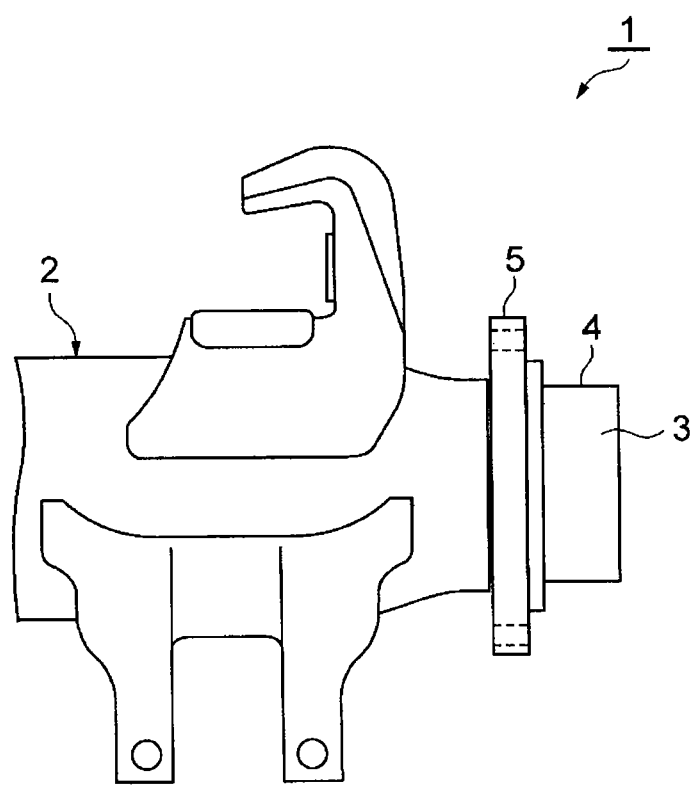
FIG. 2 is a diagram illustrating a brake flange press-fitting step.

When the reduced-diameter portion forming step is finished, next, the brake flange press-fitting step is performed. As illustrated in FIG. 2, in the brake flange press-fitting step, the brake flange 5 is press-fitted to the outer peripheral surface of the reduced-diameter portion 4. The brake flange 5 is a ring-shaped member for attaching a drum brake (not illustrated), and is formed with holes for attaching the drum brake in a circumferential direction. In addition, for example, press-fitting of the brake flange 5 with respect to the reduced-diameter portion 4 can be performed by a general press machine.

Figure 3:
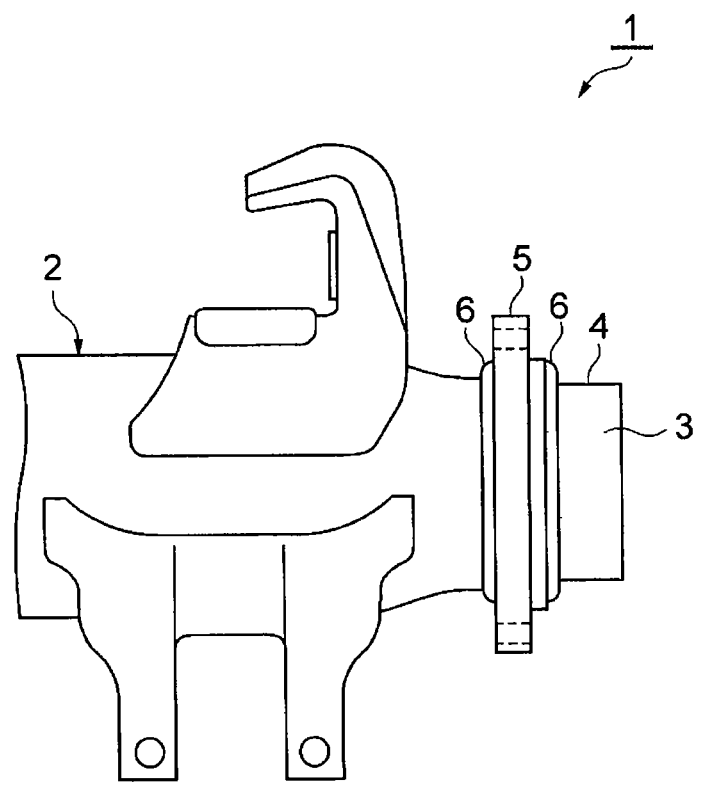
FIG. 3 is a diagram illustrating a brake flange welding step.

When the brake flange press-fitting step is finished, next, the brake flange welding step is performed. As illustrated in FIG. 3, in the brake flange welding step, the brake flange 5 is welded to the whole circumference of the rear axle housing 2 (the reduced-diameter portion 4). The welding of the brake flange 5 with respect to the rear axle housing 2 is performed on both the inner side and the outer side of the brake flange 5.

Here, the whole circumference welding of the brake flange 5 with respect to the rear axle housing 2 will be described in detail with reference to FIGS. 6 and 7.

Figure 6:
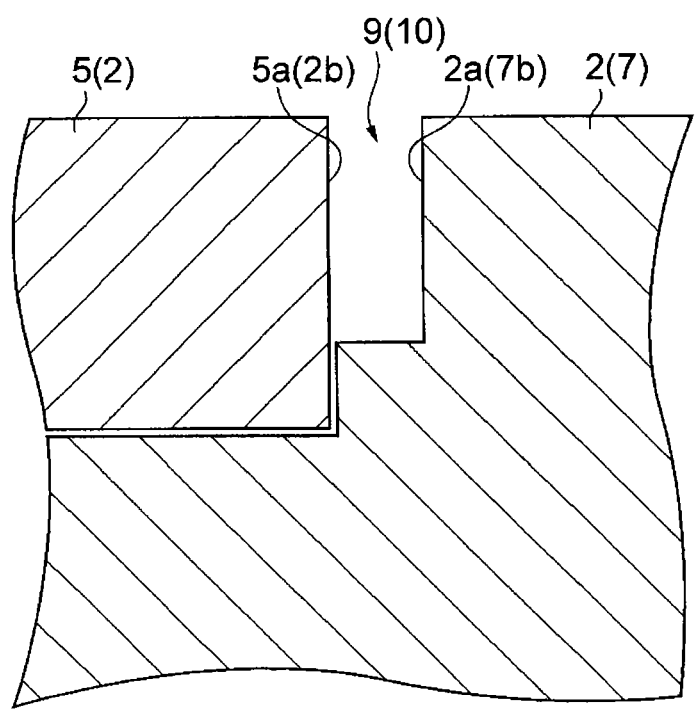
FIG. 6 is a cross-sectional view illustrating a gap shape of a narrow gap.

First, as illustrated in FIG. 6, at a position in which the rear axle housing 2 and the brake flange 5 are joined to each other, a groove-shaped narrow gap 9 is formed in a substantially U shape in which the facing surfaces are substantially parallel to each other. The narrow gap 9 is defined by a brake flange facing surface 5a of the brake flange 5 that faces the rear axle housing 2, and a rear axle housing facing surface 2a of the rear axle housing 2 that faces the brake flange 5. The brake flange facing surface 5a and the rear axle housing facing surface 2a are substantially parallel to each other. In addition, the shape of the bottom of the narrow gap 9 is not particularly limited, and may be a planar shape or a curved shape.

Moreover, the rear axle housing 2 and the brake flange 5 are arc-welded along the narrow gap 9. In the arc-welding, tandem cold welding is performed. The cold tandem welding is a welding method that uses two wires of a precedent welding wire and a subsequent filler wire, forms a melt zone in the gap by the arc generated by energizing the precedent welding wire, and supplies the subsequent filler wire to the melt zone without energizing before the melt zone is cured.

Figure 7:
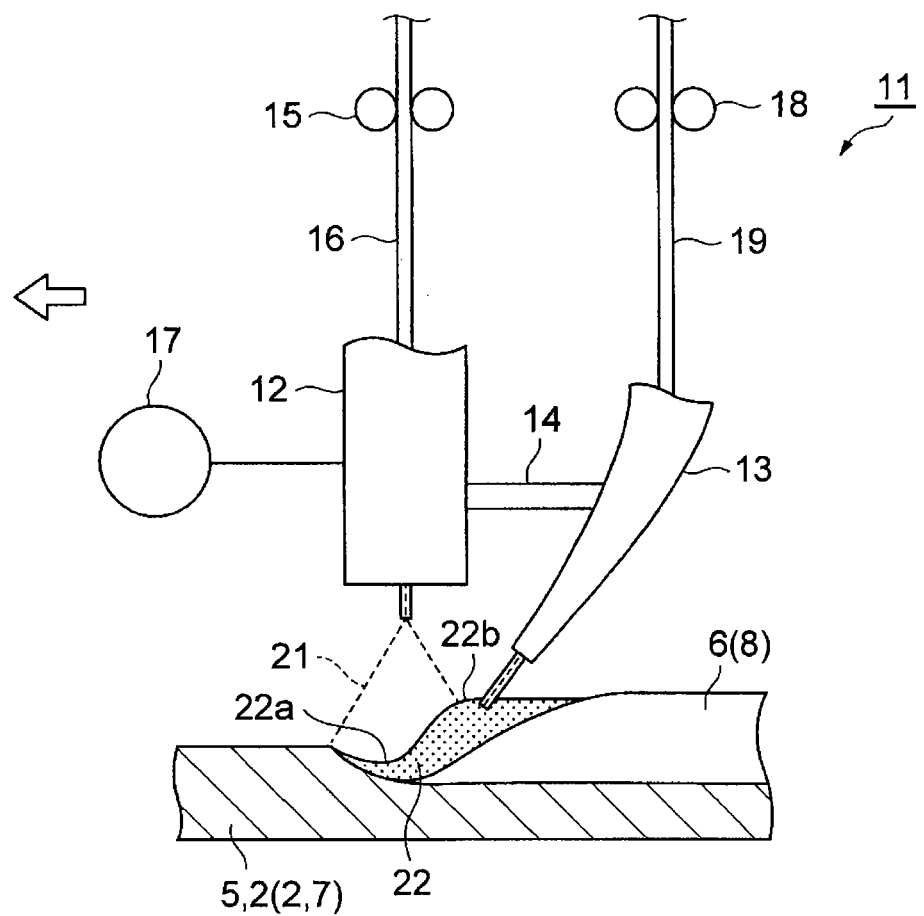
FIG. 7 is a diagram illustrating a welding method in a brake flange welding step and an axle end welding step.

As illustrated in FIG. 7, a welding apparatus 11 configured to perform the cold tandem welding has an arc-welding torch 12, a filler wire supply device 13, and a connecting member 14.

The arc-welding torch 12 is configured to perform the arc-welding. The arc-welding torch 12 sends out a welding wire 16 as a consumable electrode sent out from a first wire delivery device 15 toward a welding position of a base material. In addition, the arc-welding torch 12 supplies the welding current supplied from a power supply 17 to the welding wire 16 to generate an arc between the welding wire 16 and the base metal. As the welding wire 16, for example, it is possible to use a solid wire that is based on JIS Z3312 YGW12.

The filler wire supply device 13 is configured to send out the filler wire 19 sent out from a second wire delivery device 18 to an adjacent position from the welding position of the base material without energizing. As the filler wire 19, for example, it is possible to use a solid wire that is based on JIS Z3312 YGW12.

The connecting member 14 is a device that connects the arc-welding torch 12 and the filler wire supply device 13, while maintaining an interval between the arc-welding torch 12 and the filler wire supply device 13 so that a predetermined distance is formed between the welding position of the welding wire 16 and the delivery position of the filler wire 19. The connecting member 14 may connect the arc-welding torch 12 and the filler wire supply device 13 in an attachable and detachable manner, or may fixedly connect the arc-welding torch 12 and the filler wire supply device 13. In addition, the connecting member 14 may fix the interval between the arc-welding torch 12 and the filler wire supply device 13, or may vary the interval between the arc-welding torch 12 and the filler wire supply device 13.

In the welding apparatus 11 configured as described above, when the arc-welding torch 12 and the filler wire supply device 13 connected to the connecting member 14 relatively move with respect to the base material, the filler wire supply device 13 is disposed behind the arc-welding torch 12 in the movement direction. For this reason, the delivery position of the filler wire 19 is behind the welding position of the welding wire 16 in the movement direction. In this embodiment, a direction, in which the arc-welding torch 12 and the filler wire supply device 13 relatively move with respect to the base material, is referred to as a "traveling direction".

Moreover, in the cold tandem welding, the arc-welding torch 12 and the filler wire supply device 13 are relatively moved with respect to the rear axle housing 2 and the brake flange 5 as a base material along the narrow gap 9. Then, the arc-welding torch 12 moves before the filler wire supply device 13, and the filler wire supply device 13 moves after the arc-welding torch.

At this time, in the arc-welding torch 12 that precedes the filler wire supply device 13, the welding current is supplied to the welding wire 16 to generate the arc 21 between the welding wire 16 and the narrow gap 9. Then, the melt zone 22, in which the welding wire 16, the rear axle housing 2, and the brake flange 5 are melted, is formed in the narrow gap 9.

The melt zone 22 is formed of a molten pool. The melt zone 22 is dug down by receiving pressure from the arc 21 (arc power) below the arc 21, and a portion that is dug most by the arc force becomes a bottom 22a of the melt zone 22. Furthermore, as the melt zone 22 is away from the bottom 22a, the influence of the arc force is weakened, and the melt zone 22 gradually rises and swells. For this reason, a raised portion 22b formed by the rise of the melt zone 22 is formed in the rear of the bottom 22a in the traveling direction. In addition, the raised portion 22b is a portion that is formed of a molten metal prior to curing (coagulation). Moreover, when the raised portion 22b is cooled and cured (coagulated), an excess weld 6 is formed at a joining position between the rear axle housing 2 and the brake flange 5. In addition, the excess weld 6 is also referred to as a bead.

Meanwhile, from the filler wire supply device 13 subsequent to the arc-welding torch 12, the filler wire 19 is supplied to the raised portion 22b of the melt zone 22 without energizing. For example, adjustment of the supply position of the filler wire 19 can be performed by adjustment of the interval between the arc-welding torch 12 and the filler wire supply device 13 using the connecting member 14, adjustment of the direction of the filler wire supply device 13 or the like.

When the filler wire 19 is supplied to the raised portion 22b of the melt zone 22, the filler wire 19 is melted by heat of the melt zone 22, and the melt zone 22 is replenished with the molten metal. Thus, the favorable excess weld 6 is formed.

In addition, since the filler wire 19 which is not energized is not heated, when the filler wire 19 is supplied to the raised portion 22b of the melt zone 22, the filler wire 19 deprives the melt zone 22 of the heat, and the melt zone 22 is cooled.

Here, a state when performing arc-welding of the rear axle housing 2 and the brake flange 5 by the cold tandem welding along the narrow gap 9 will be described with reference to FIGS. 7 and 8.

Figure 8:
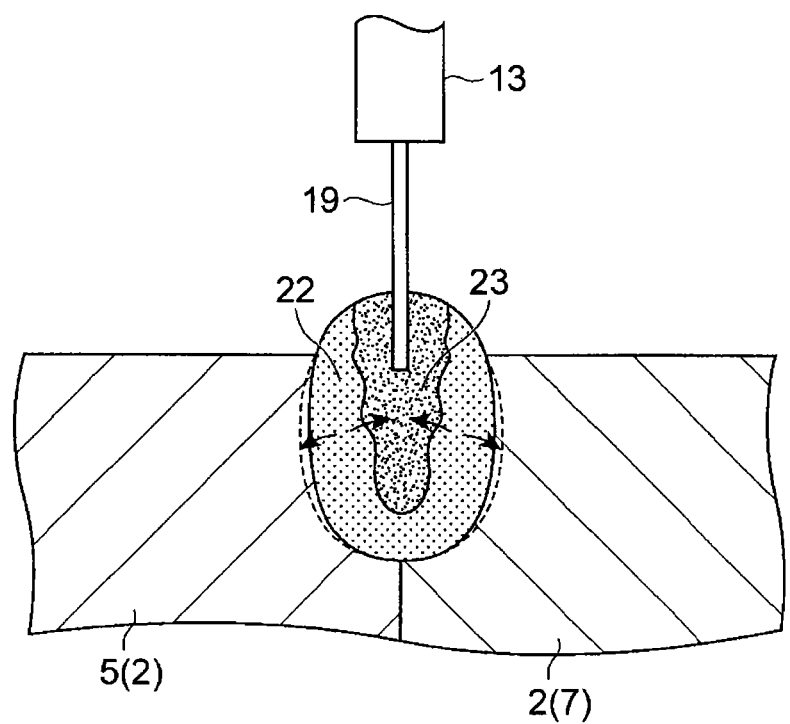
FIG. 8 is a diagram illustrating a state of performing a cold tandem welding along the narrow gap.

As illustrated in FIGS. 7 and 8, when the filler wire 19 is supplied to the raised portion 22b of the melt zone 22, since a low-temperature melt zone 23 obtained by melting of the filler wire 19 is formed in a central portion of the melt zone 22, a contraction range of the melt zone 22 becomes narrower than a case of a normal arc-welding in which the filler wire 19 is not supplied to the melt zone 22. For this reason, when the melt zone 22 is cooled and cured, the contraction of the melt zone 22 becomes significantly smaller than the case of the normal arc-welding. Moreover, in the melt zone 22, since the heat is deprived so as to melt the cold filler wire 19, an amount of heat input to the rear axle housing 2 and the brake flange 5 from the melt zone 22 is suppressed to a significantly lower level than the case of the normal arc-welding.

Figure 4:
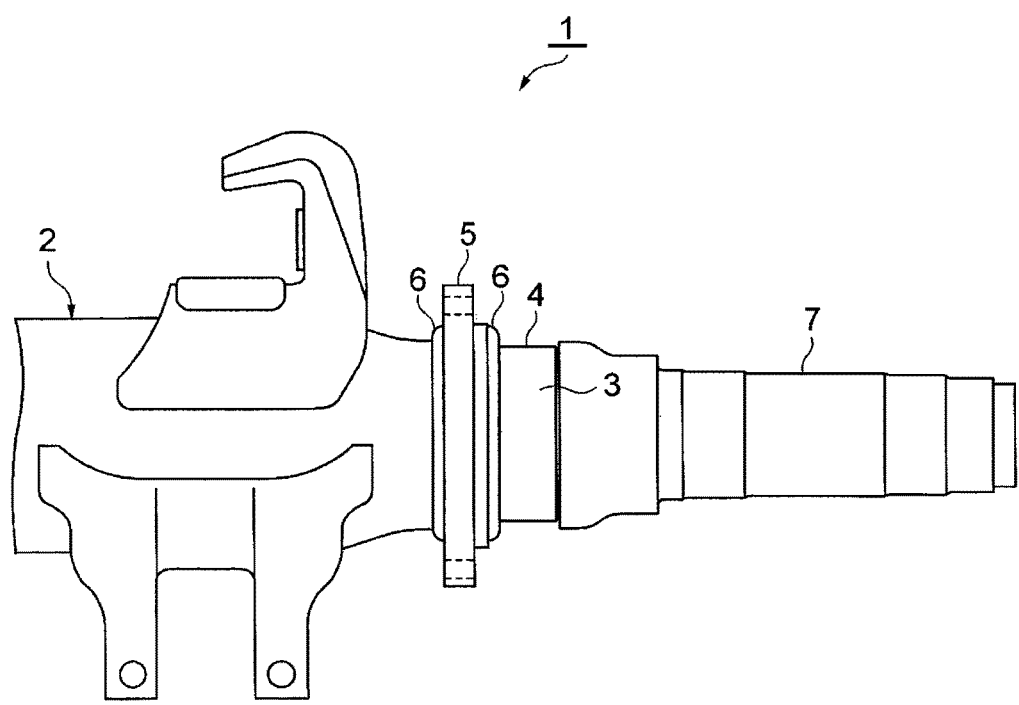
FIG. 4 is a diagram illustrating an axle end press-fitting step.

When the brake flange welding step is finished, next, the axle end press-fitting step is performed. As illustrated in FIG. 4, in the axle end press-fitting step, an axle end 7 is press-fitted to the inner peripheral surface of the end portion 3 of the rear axle housing 2. The axle end 7 is formed in a cylindrical shape, and its outer diameter is slightly larger than the inner diameter of the end portion 3 of the rear axle housing 2. In addition, press-fitting of the axle end 7 with respect to the end portion 3 of the rear axle housing 2 may be carried out, for example, by a general press machine.

Figure 5:
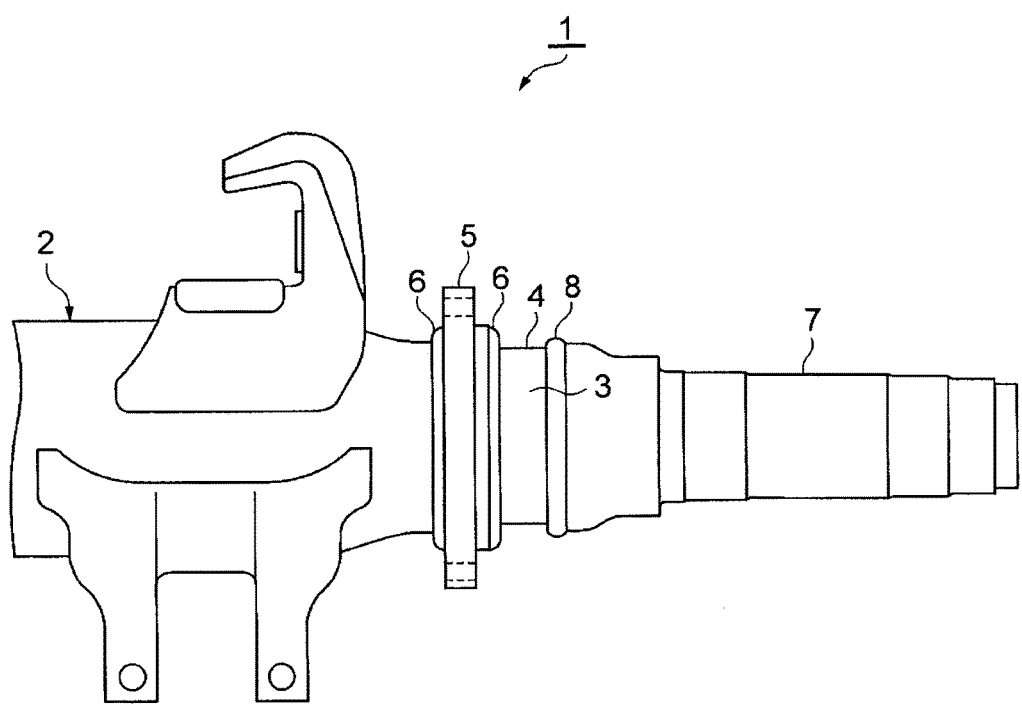
FIG. 5 is a diagram illustrating an axle end welding step.

When the axle end press-fitting step is finished, next, the axle end welding step is performed. As illustrated in FIG. 5, in the axle end welding step, the axle end 7 is welded to the whole circumference of the rear axle housing 2.

Welding of the axle end 7 with respect to the rear axle housing 2 is the same as welding (brake flange welding step) of the brake flange 5 with respect to the rear axle housing 2 as described above. That is, first, as illustrated in FIG. 6, at a position in which the axle end 7 and the rear axle housing 2 are joined to each other, a narrow gap 10 formed in a substantially U shape having the facing surfaces substantially parallel to each other is formed. The narrow gap 10 is defined by a rear axle housing facing surface 2b of the rear axle housing 2 that faces the axle end 7, and an axle end facing surface 7b of the axle end 7 that faces the rear axle housing 2, and the rear axle housing facing surface 2b and the axle end facing surface 7b are substantially parallel to each other.

Moreover, as illustrated in FIG. 7, the rear axle housing 2 and the axle end 7 are arc-welded along the narrow gap 10 by the cold tandem welding. The cold tandem welding is as described above. Thus, an excess weld 8, in which the melt zone 22 is raised, and cooled and cured (coagulated), is formed between the rear axle housing 2 and the axle end 7.

In the rear axle 1 manufactured in this way, at the end portion 3 of the rear axle housing 2, a reduced-diameter portion 4 having an outer circumference of a reduce diameter is formed, the brake flange 5 is press-fitted to the outer peripheral surface of the reduced-diameter portion 4, and the brake flange 5 is welded to the whole circumference of the rear axle housing 2. Also, in the rear axle 1, the axle end 7 is press-fitted to the inner peripheral surface of the end portion 3 of the rear axle housing 2, and the axle end 7 is welded to the whole circumference of the rear axle housing 2. In addition, the whole circumference welding of the brake flange 5 with respect to the rear axle housing 2 is carried out by the cold tandem welding along the narrow gap 9, and the whole circumference welding of the axle end 7 with respect to the rear axle housing 2 is carried out by the cold tandem welding along the narrow gap 10.

As described above, according to the present embodiment, since the brake flange 5 and the axle end 7 are welded to the whole circumference of the rear axle housing 2 by press-fitting the brake flange 5 and the axle end 7 with respect to the rear axle housing 2, it is possible to manufacture the rear axle 1 without passing through the shrink-fitting step. Thus, since it is possible to simplify the manufacturing step, it is possible to reduce the space and investment of shrink-fitting apparatus and to achieve resource conservation and reduction of $CO_2$ emission.

In addition, by forming the reduced-diameter portion 4 at the end portion 3 of the rear axle housing 2, it is possible to easily press-fit the brake flange 5 with respect to the rear axle housing 2 and to reduce the internal stress of the rear axle housing 2 and the brake flange 5.

Furthermore, since the whole circumference welding of the brake flange 5 with respect to the rear axle housing 2 and the whole circumference welding of the axle end 7 with respect to the rear axle housing 2 are performed by the cold tandem welding, it is possible to cool the melt zone 22 by the cold filler wire 19. As a result, since the heat shrinkage range of the melt zone 22 becomes narrower, it is possible to significantly reduce the thermal shrinkage when the melt zone 22 is cooled and cured. Thus, it is possible to significantly improve the perpendicularity of the brake flange 5 with respect to the rear axle housing 2 and to significantly suppress the deflection of the axle end 7 with respect to the rear axle housing 2. Furthermore, it is possible to suppress the amount of heat input to the rear axle housing 2, the brake flange 5, and the axle end 7, to be small. Moreover, since the molten metal is replenished to the melt zone 22 by supplying the filler wire 19 to the melt zone 22, it is possible to form the favorable excess weld 6 and excess weld 8, and it is possible to suppress an occurrence of weld defects such as humping. Furthermore, since the residual stress can be remarkably reduced, a margin to the yield point can be formed, which can contribute to an improvement of service life compared to the related art.

In addition, since the groove width of the gap becomes narrower than the case of assuming the gap to be a Y groove by assuming the gap to be the narrow gap 9 and the narrow gap 10, it is possible to reduce the thermal distortion (thermal shrinkage) of the excess weld 6 and the excess weld 8, and it is possible to suppress the amount of heat input to the rear axle housing 2, the brake flange 5, and the axle end 7, to be small. Thus, since the deterioration of the balance of thermal shrinkage along the welding surface is suppressed, it is possible to further improve the perpendicularity of the brake flange 5 with respect to the rear axle housing 2, and to further suppress the deflection of the axle end 7 with respect to the rear axle housing 2. Moreover, since the narrow gap 9 and the narrow gap 10 are formed in a substantially U shape having the facing surfaces that are substantially parallel to each other, it is possible to further suppress the variation of the positional relation between the members.

Also, it is possible to suppress the filler wire 19 from being directly heated by the arc 21, by supplying the filler wire 19 to the raised portion 22b of the melt zone 22 behind the arc 21 in the traveling direction. For this reason, it is possible to enhance the cooling effect of the melt zone 22, and since it is possible to supply the filler wire 19 before the melt zone 22 is cooled and cured, it is possible to suppress the formation shortage of the excess weld 8.

The preferred embodiment of an aspect of the present invention has been described above, but the present invention is not limited to the above-described embodiment.

For example, in the above-described embodiment, the case of adopting the cold tandem welding as a method of arc-welding has been described, but other methods may be used.

Furthermore, in the above-described embodiment, the case of using the gap as the narrow gap, but a gap of another shape may also be used.

Moreover, in the above-described embodiment, the description has been given of the case where the brake flange 5 and the rear axle housing 2 are welded over the whole circumference, and the axle end 7 and the rear axle housing 2 are welded over the whole circumference, but they do not need to be necessarily welded over the whole circumference.

Furthermore, in the above-described embodiment, the description has been given of the case where the brake flange press-fitting step, the brake flange welding step, the axle end press-fitting step, and the axle end welding step are performed in order, but the order of these steps can be appropriately replaced. For example, the brake flange press-fitting step, the axle end press-fitting step, the brake flange welding step, and the axle end welding step may also be performed in order.

REFERENCE SIGNS LIST 1 rear axle
2 rear axle housing
2a rear axle housing facing surface
3 end portion
4 reduced-diameter portion
5 brake flange
5a brake flange facing surface
6 excess weld
7 axle end
8 excess weld
9 narrow gap
10 narrow gap
11 welding apparatus
12 arc-welding torch
13 filler wire supply device
14 connecting member
15 first wire delivery device
16 welding wire (electrode)
17 power supply
18 second wire delivery device
19 filler wire (subsequent wire)
21 arc
22 melt zone
22a bottom
22b raised portion
23 melt zone

The invention claimed is:

1. A method for manufacturing a rear axle comprising:
press-fitting a brake flange to an outer peripheral surface of a rear axle housing;
welding the rear axle housing and the brake flange;
press-fitting an axle end to an inner peripheral surface of an end portion of the rear axle housing; and
welding the rear axle housing and the axle end,
wherein, in the welding of the rear axle housing and the brake flange, a melt zone is formed in a gap between the rear axle housing and the brake flange by an arc generated by energizing an electrode, and before the melt zone is cured, a first subsequent wire is supplied to the melt zone without being energized, and
wherein, in the welding of the rear axle housing and the axle end, a melt zone is formed in a gap between the rear axle housing and the axle end by an arc generated by energizing an electrode, and before the melt zone is cured, a second subsequent wire is supplied to the melt zone without being energized.

2. The method for manufacturing the rear axle according to claim 1, further comprising:
forming a reduced-diameter portion having an outer circumference of a reduced diameter at the end portion of the rear axle housing, before the press-fitting of the brake flange
wherein, in the press-fitting of the brake flange, the brake flange is press-fitted to the outer peripheral surface of the reduced-diameter portion.

3. The method for manufacturing the rear axle according to claim 1,
wherein the first and second subsequent wires are supplied to a raised portion of the melt zone in a rear of a traveling direction.

4. The method for manufacturing the rear axle according to claim 1,
wherein, in the welding of the rear axle housing and the brake flange, the gap is a narrow gap having a substantially U-shaped cross-section in which facing surfaces are substantially parallel to each other, and a bottom of the narrow gap is formed by the rear axle housing, and
in the welding of the rear axle housing and the axle end, the gap is a narrow gap having a substantially U-shaped cross-section in which facing surfaces are substantially parallel to each other, and a bottom of the narrow gap is formed by the axle end.

5. A rear axle manufactured by the method according to claim 1.

6. A method for manufacturing a rear axle comprising:
forming a reduced-diameter portion having an outer circumference of a reduced diameter at the end portion of a rear axle housing;
press-fitting a brake flange to an outer peripheral surface of a rear axle housing after forming the reduced-diameter portion;
welding the rear axle housing and the brake flange;
press-fitting an axle end to an inner peripheral surface of an end portion of the rear axle housing; and
welding the rear axle housing and the axle end such that the axle end is peripherally enclosed by the welding.

7. A method for manufacturing a rear axle comprising:
press-fitting a brake flange to an outer peripheral surface of a rear axle housing;
welding the rear axle housing and the brake flange;
press-fitting an axle end to an inner peripheral surface of an end portion of the rear axle housing; and welding the rear axle housing and the axle end such that the axle end is peripherally enclosed by the welding, wherein the axle end and the inner peripheral surface have a circular cross-section that is perpendicular to a longitudinal axis.

* * * * *